United States Patent [19]
Chacon, Jr. et al.

[11] Patent Number: 5,437,121
[45] Date of Patent: Aug. 1, 1995

[54] DEVICE FOR SUPPORTING A FISHING ROD AND FOR PROVIDING A PERIODIC LIFTING MOTION TO THE ROD TO EFFECT JIGGING

[76] Inventors: Eugene O. Chacon, Jr., 1660 Ross Ave.; Rodney D. David, 208 White Pine, both of Alamosa, Colo. 81101

[21] Appl. No.: 224,570

[22] Filed: Apr. 7, 1994

[51] Int. Cl.$^6$ ............................................. A01K 97/10
[52] U.S. Cl. ........................................ 43/19.2; 43/26.1
[58] Field of Search ............................ 43/19.2, 26.1

[56] References Cited

U.S. PATENT DOCUMENTS

| | | | |
|---|---|---|---|
| 2,707,843 | 5/1955 | Howe | 43/26.1 |
| 3,031,790 | 5/1962 | Duryea | 43/19.2 |
| 3,550,302 | 12/1970 | Creviston | 43/19.2 |
| 3,691,668 | 9/1972 | Strebig | 43/19.2 |
| 3,839,810 | 10/1974 | Lagasse | 43/19.2 |
| 4,251,939 | 2/1981 | Tiede | 43/19.2 |
| 4,660,317 | 4/1987 | Evans | 43/19.2 |
| 4,779,371 | 10/1988 | Braud | 43/19.2 |

*Primary Examiner*—Kurt Rowan

[57] ABSTRACT

A device for supporting a fishing rod and for providing a periodic lifting motion to the rod to effect jigging comprising, of a box-like housing in a generally rectangular configuration with a lower bottom wall, with front, rear and side edges, upstanding rectangular front and rear walls parallel with each other and extending upwardly from the front and rear edges of the bottom wall and with rectangular side walls parallel with each other and extending upwardly from the side edges of the bottom wall and coupled at their vertical side edges to the vertical edges of the front and rear walls and a rectangular top wall removably coupled at its periphery to the upper edges of the front, rear and side walls. Screws to removable couple the top wall from the upper edges of the front, rear and side walls. A fishing rod holder secured to one side wall of the housing above the central plane thereof and adjacent to the back wall, the holder having a lower planar surface in an angular orientation with respect to the top and bottom walls for supporting a central extent of a fishing rod at an angle with its lower most end on the ground, the holder also having a vertically extending wall located outwardly from the supporting side wall of the housings. A motor mounted within the housing with a battery for providing a source of potential to drive the motor, a power switch located within the housing with a toggle extending exteriorly of the housing through the adjacent side wall thereof opposite from the holder, the toggle movable between an on position wherein power is provided to the motor and an off position where power to the motor is stopped. A speed switch mounted in the side wall of the housing with the switch. Electrical wires coupling the motor, battery and switch. A drive rod extending vertically from the motor through the side wall supporting the holder, the drive rod having an L-shaped member with a long vertical leg coupled at a first interior end to the rod of the motor and with a second exterior end extending horizontally at a right angle from the first end, the L-shaped member adapted to rotate with the activation of the motor and rotation of the drive shaft, the L-shaped member adapted to periodically contact the fishing rod at a location above and forwardly of the holder to effect its jigging.

2 Claims, 4 Drawing Sheets

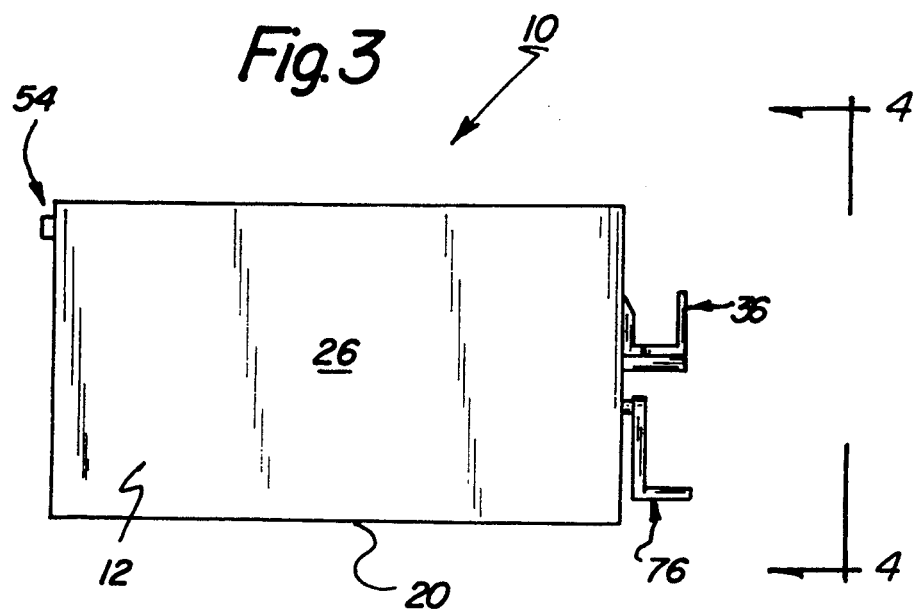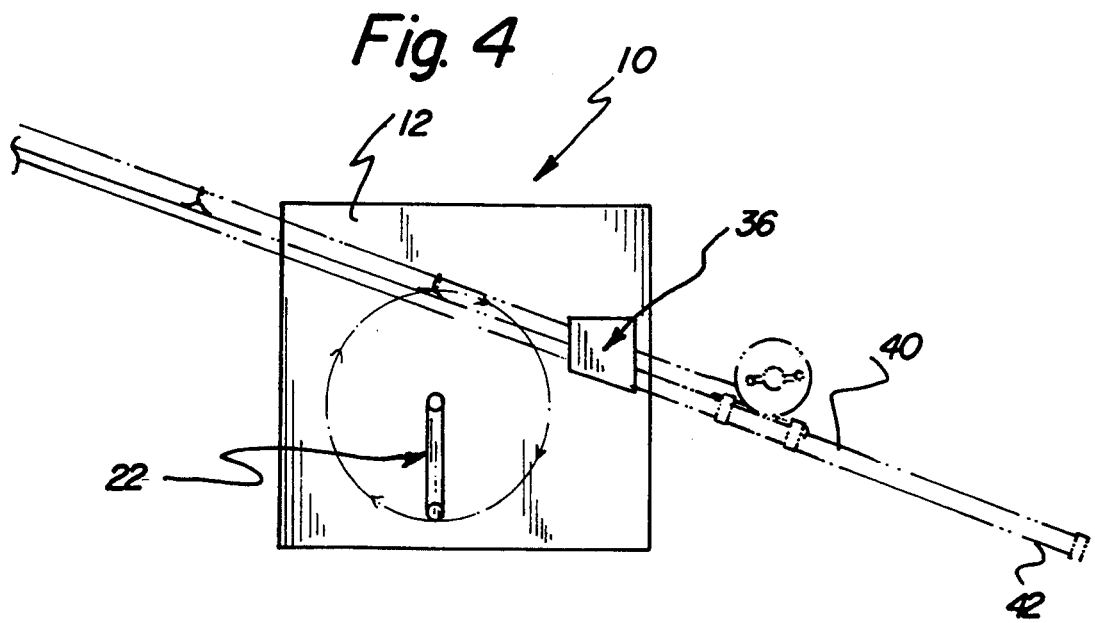

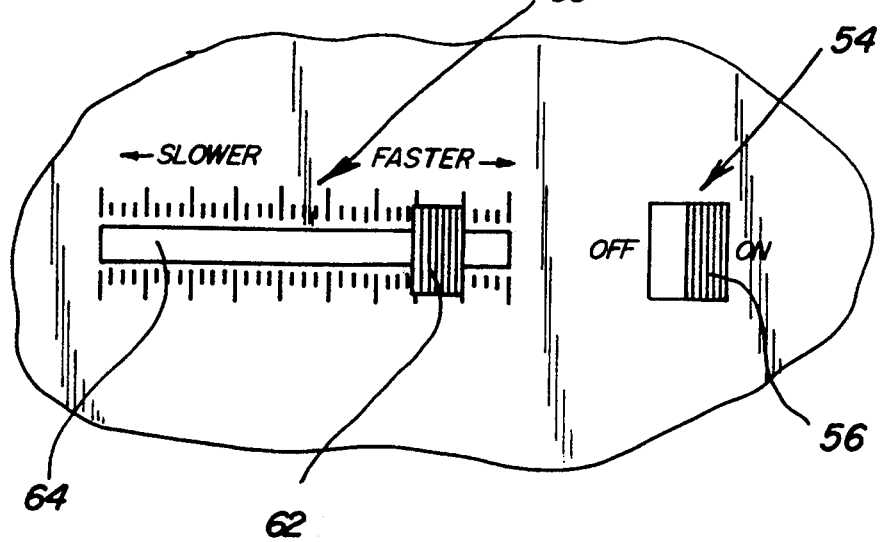
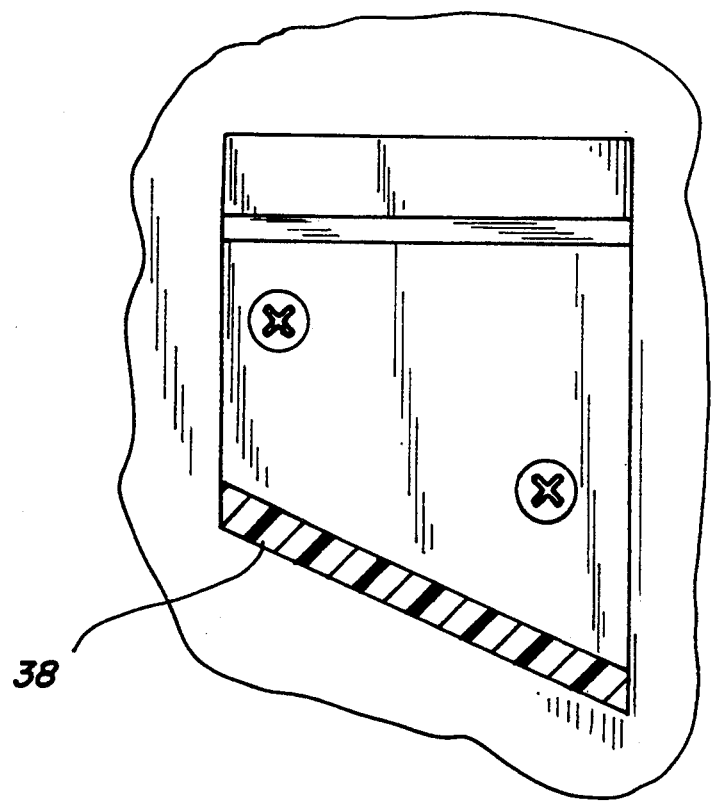

DEVICE FOR SUPPORTING A FISHING ROD AND FOR PROVIDING A PERIODIC LIFTING MOTION TO THE ROD TO EFFECT JIGGING

BACKGROUND OF THE INVENTION

1. Field of the Invention

The present invention relates to device for supporting a fishing rod and for providing a periodic lifting motion to the rod to effect jigging and more particularly pertains to supporting fishing rods and effecting periodic jigging through a continuous and automatic motion imparting mechanism.

2. Description of the Prior Art

The use of a devices for supporting rods and for jigging the supported rods is known in the prior art. More specifically, devices for supporting rods and for jigging the supported rods heretofore devised and utilized for the purpose of supporting fishing rods and jigging the rods periodically are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,119,580 to Schulte et al. a device for jigging a fishing pole.

U.S. Pat. No. 5,056,255 to Campbell discloses a fishing rod jigging apparatus.

U.S. Pat. No. 5,036,616 to Wilsey discloses a fish bait jigger.

U.S. Pat. No. 4,951,411 to Ecker an electrically operated fishing jigger.

U.S. Pat. No. 4,660,317 to Evans discloses an apparatus or supporting and agitating a fishing rod.

In this respect, the device for supporting a fishing rod and for providing a periodic lifting motion to the rod to effect jigging according to the present invention substantially departs from the conventional concepts and designs of the prior art, and in doing so provides an apparatus primarily developed for the purpose of support fishing rods and effect periodic jigging through a continuous and automatic motion imparting mechanism.

Therefore, it can be appreciated that there exists a continuing need for a new and improved device for supporting a fishing rod and for providing a periodic lifting motion to the rod to effect jigging which can be used for supporting fishing rods and effecting periodic jigging through a continuous and automatic motion imparting mechanism. In this regard, the present invention substantially fulfills this need.

SUMMARY OF THE INVENTION

In view of the foregoing disadvantages inherent in the known types of devices for supporting rods and for jigging the supported rods now present in the prior art, the present invention provides an improved device for supporting a fishing rod and for providing a periodic lifting motion to the rod to effect jigging. As such, the general purpose of the present invention, which will be described subsequently in greater detail, is to provide a new and improved device for supporting a fishing rod and for providing a periodic lifting motion to the rod to effect jigging and method which has all the advantages of the prior art and none of the disadvantages.

To attain this, the present invention essentially comprises a new and improved device for supporting a fishing rod and for providing a periodic lifting motion to the rod to effect jigging comprising of a box-like housing in a generally rectangular configuration with a lower bottom wall, with front, rear and side edges, upstanding rectangular front and rear walls parallel with each other and extending upwardly from the front and rear edges of the bottom wall and with rectangular side walls parallel with each other and extending upwardly from the side edges of the bottom wall and coupled at their vertical side edges to the vertical edges of the front and rear walls and a rectangular top wall removably coupled at its periphery to the upper edges of the front, rear and side walls. Screws to removable couple the top wall from the upper edges of the front, rear and side walls. A fishing rod holder secured to one side wall of the housing above the central plane thereof and adjacent to the back wall, the holder having a lower planar surface in an angular orientation with respect to the top and bottom walls for supporting a central extent of a fishing rod at an angle with its lower most end on the ground, the holder also having a vertically extending wall located outwardly from the supporting side wall of the housings. A motor mounted within the housing with a battery for providing a source of potential to drive the motor, a power switch located within the housing with a toggle extending exteriorly of the housing through the adjacent side wall thereof opposite from the holder, the toggle movable between an on position wherein power is provided to the motor and an off position where power to the motor is stopped. A speed switch mounted in the side wall of the housing adjacent to the switch. Electrical wires coupling the motor, battery and power switch as well as the speed control switch. A drive rod extending vertically from the motor through the side wall supporting the holder, the drive rod having an L-shaped member with a long vertical leg coupled at a first interior end to the rod of the motor and with a second exterior end extending horizontally at a right angle from the first end, the L-shaped member adapted to rotate with the activation of the motor and rotation of the drive shaft, the L-shaped member adapted to periodically contact the fishing rod at a location above and forwardly of the holder to effect its jigging.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved device for supporting a fishing rod and for providing a periodic lifting motion to the rod to effect jigging which have all the advantages of the prior art devices for supporting rods and for jigging the supported rods and none of the disadvantages.

It is another object of the present invention to provide a new and improved device for supporting a fishing rod and for providing a periodic lifting motion to the rod to effect jigging which may be easily and efficiently manufactured and marketed.

It is further object of the present invention to provide a new and improved device for supporting a fishing rod and for providing a periodic lifting motion to the rod to effect jigging which are of durable and reliable constructions.

An even further object of the present invention is to provide a new and improved device for supporting a fishing rod and for providing a periodic lifting motion to the rod to effect jigging which are susceptible of a low cost of manufacture with regard to both materials and labor, and which accordingly is then susceptible of low prices of sale to the consuming public, thereby making such device for supporting a fishing rod and for providing a periodic lifting motion to the rod to effect jigging economically available to the buying public.

Still yet another object of the present invention is to provide a new and improved device for supporting a fishing rod and for providing a periodic lifting motion to the rod to effect jigging which provides in the apparatuses and methods of the prior art some of the advantages thereof, while simultaneously overcoming some of the disadvantages normally associated therewith.

Still another object of the present invention is to support a fishing rod and effect periodic jigging through a continuous and automatic motion imparting mechanism.

Lastly, it is an object of the present invention to provide new and improved device for supporting a fishing rod and for providing a periodic lifting motion to the rod to effect jigging comprising, in combination, a box-like housing in a generally rectangular configuration with a lower bottom wall, with front, rear and side edges, upstanding rectangular front and rear walls parallel with each other and extending upwardly from the front and rear edges of the bottom wall and with rectangular side walls parallel with each other and extending upwardly from the side edges of the bottom wall and coupled at their vertical side edges to the vertical edges of the front and rear walls and a rectangular top wall removably coupled at its periphery to the upper edges of the front, rear and side walls. Screws to removable couple the top wall from the upper edges of the front, rear and side walls. A fishing rod holder secured to one side wall of the housing above the central plane thereof and adjacent to the back wall, the holder having a lower planar surface in an angular orientation with respect to the top and bottom walls for supporting a central extent of a fishing rod at an angle with its lower most end on the ground, the holder also having a vertically extending wall located outwardly from the supporting side wall of the housings. A motor mounted within the housing with a battery for providing a source of potential to drive the motor, a power switch located within the housing with a toggle extending exteriorly of the housing through the adjacent side wall thereof opposite from the holder, the toggle movable between an on position wherein power is provided to the motor and an off position where power to the motor is stopped. A speed switch mounted in the side wall of the housing with the switch. Electrical wires coupling the motor, battery and switch. A drive rod extending vertically from the motor through the side wall supporting the holder, the drive rod having an L-shaped member with a long vertical leg coupled at a first interior end to the rod of the motor and with a second exterior end extending horizontally at a right angle from the first end, the L-shaped member adapted to rotate with the activation of the motor and rotation of the drive shaft, the L-shaped member adapted to periodically contact the fishing rod at a location above and forwardly of the holder to effect its jigging.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an end elevational view of the preferred embodiment of the new and improved device for supporting a fishing rod and for providing a periodic lifting motion to the rod to effect jigging. Constructed in accordance with the principals of the present invention.

FIG. 4 is a side elevational view of the device shown in FIG. 3 and illustrating a fishing rod in operative position with respect thereto.

FIG. 7 is an enlarged view of the control mechanism taken along line 7—7 of FIG. 5.

FIG. 8 is a cross-sectional view taken along line 8—8 of FIG. 6.

The same reference numerals refer to the same parts through the various Figures.

DESCRIPTION OF THE PREFERRED EMBODIMENT

Figure 1:
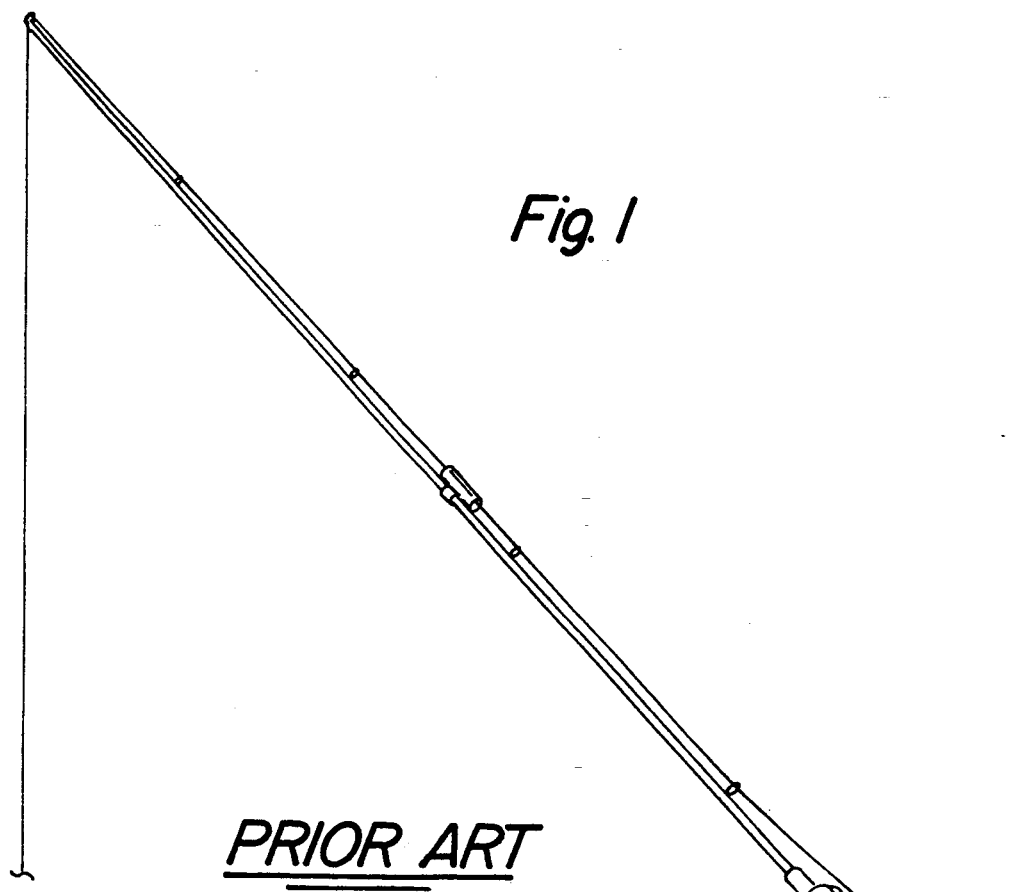
FIG. 1 is a perspective illustration of a prior art support device for a fishing rod and for effecting the jigging thereof.
Figure 2:
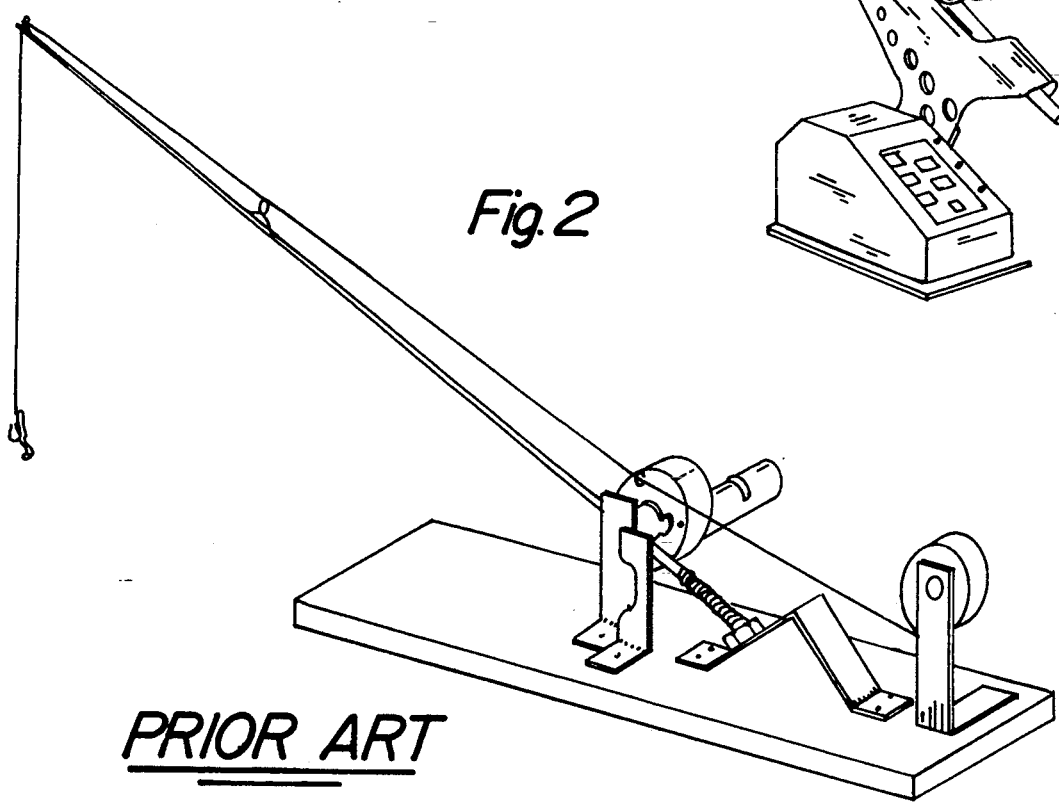
FIG. 2 is a perspective view of another prior art device for supporting a fishing rod and effecting the jigging thereof.
Figure 5:
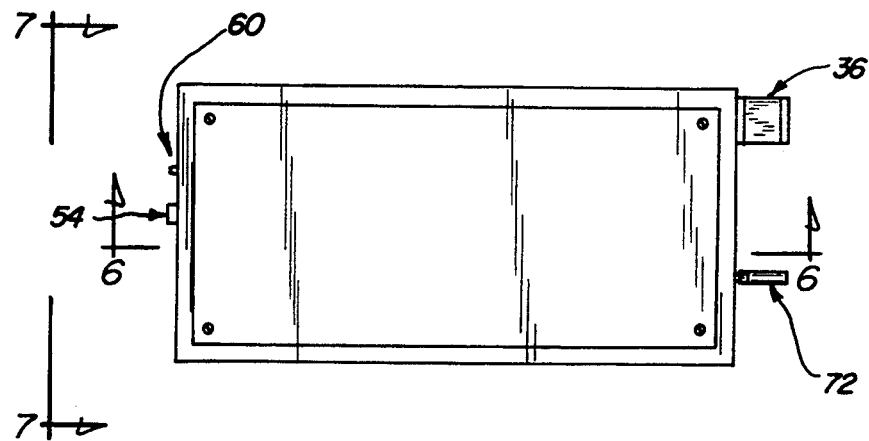
FIG. 5 is a plan view of the device illustrated in FIGS. 3 and 4.
Figure 6:
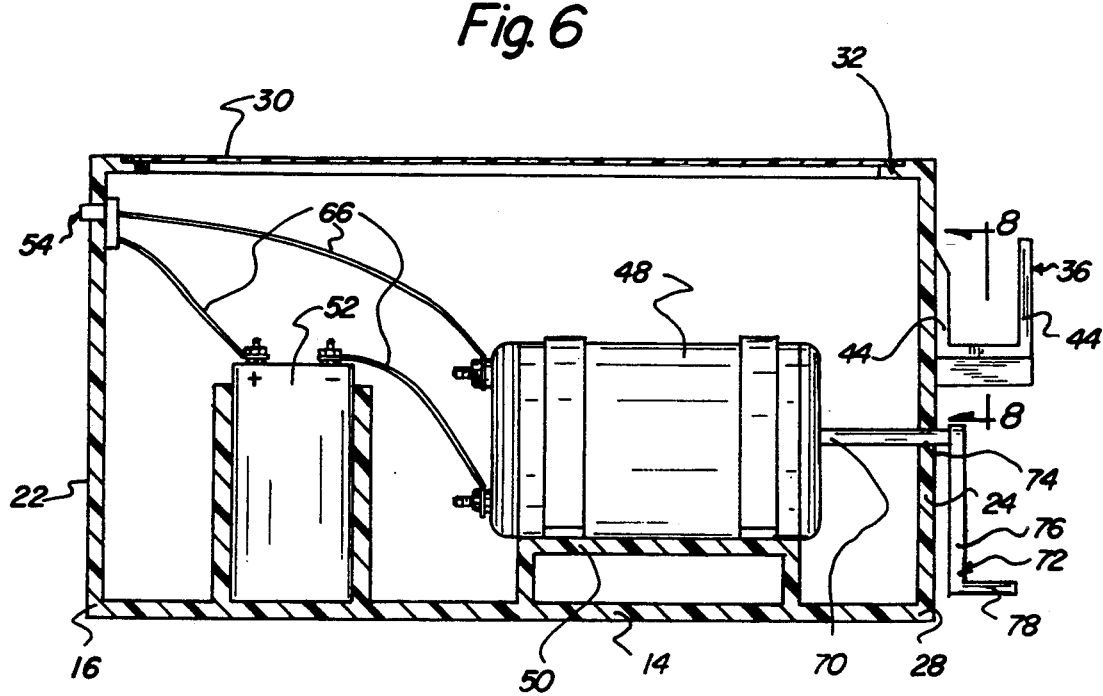
FIG. 6 is a cross-sectional view of the device taken along line 6—6 of FIG. 5.

With reference now to the drawings, and in particular to FIG. 1 thereof, the preferred embodiment of the new and improved device for supporting a fishing rod and for providing a periodic lifting motion to the rod to effect jigging embodying the principles and concepts of the present invention and generally designated by the reference numeral 10 will be described.

The present invention is a system comprised of a plurality of components. In their broadest context, such components include a housing, screws, a fishing rod holder, a motor, a speed switch, electrical wires, a drive rod and a jigging member. Such components are individually configured and correlated with respect to each other so as to attain the desired objectives.

More specifically, the housing 12 is a box-like member. It is configured in a generally rectangular configuration. It has a lower bottom wall 14 with front 16 rear 18 and side edges 20. It also has an upstanding rectangular front wall 22 and rear wall 24 which are parallel with each other and which extend upwardly from the front and rear edges of the bottom wall. In addition, rectangular sidewalls 26 are provided. The sidewalls are parallel with each other and extend upwardly from the side edges of the bottom wall. The walls are all coupled at their vertical side edges to one another to form a box-like member.

Also provided as part of the housing is a rectangular top wall 30. The top wall is removably coupled at its periphery to the upper edges of the front rear and side walls. Screws 32 are provided to couple the top wall with respect to the upper edges of the front rear and sidewalls.

Secured to the exterior surface of the housing is a fishing rod holder 36. The holder is secured to one sidewall of the housing above the central plane thereof. It is located adjacent to the backwall. The holder has a lower planar surface 38 at an angular orientation with respect to the top and bottom walls. Such planar surface is for supporting a central extent of a fishing rod 40 with the rod held at an angle with its lower most end 42 resting on the ground. The holder also has a vertically extending wall 44 located outwardly from the supporting sidewall of the housing to further retain the fishing rod in the intended orientation.

Located within the housing is a motor 48. The motor is mounted within the housing on a base 50. In association therewith is a battery 52. The battery is for providing a source of potential to drive the motor. Coupled thereto is a power switch 54 located within the housing. The power switch has a toggle 56 extending through the housing to the exterior of the housing through an adjacent sidewall thereof, a sidewall opposite from the holder. The toggle is movable between an operative on position when power is provided to the motor and an inoperative off position wherein power to the motor is stopped.

Also as part of the electrical components including battery, motor and switch, is a speed switch 60. The speed switch is mounted in the sidewall of the housing adjacent to the power switch. The speed switch functions when the power switch is activated to vary the speed of rotation of the motor and the jigging created my motion of the motor. The speed is varied by moving an operator controlled member 62 in a horizontal slot 64. Electrical wires 66 couple the motor battery and power switch as well as the speed control switch in a systems-like configuration.

The last component of the system is the drive rod 70 and associated jigging member 72. The drive rod extends horizontally from the motor through an aperture 74 in the sidewall supporting the holder and therebeneath. The drive rod has secured thereto the L-shaped jigging member with a long vertical leg 76 coupled at a first interior end to the rod of the motor. The L-shaped member also has a second exterior end 78 extending horizontally at a right angle from the first end. The L-shaped member is adapted to rotate with the activation of the motor and rotation of the drive shaft. The L-shaped member is adapted to have its horizontal component periodically contact the lower surface of the fishing rod above the holder at a location above and forwardly of the holder in order to effect the appropriate jigging of the fishing rod when supported on the holder and the motor being activated.

Ice fishing is a very popular winter sport in many areas of the country and around the world. Many fishermen use tip-ups for fishing through the ice, while others may use a hand jig. The latter requires the angler to sit next to the hole in the ice and periodically move the pole tip in a vertical oscillating motion, to cause the bait or lure to move up and down in the water. This action attracts more attention from the fish, and induces them to strike. Sitting or standing in one position on the ice is a very cold experience for an angler; occasional movement is necessary to stay warm.

The present invention, a device for supporting a fishing rod and for providing a periodic lifting motion to the rod to effect jigging, is a device that automatically moves the pole in the required up and down motion, without intervention of the angler. It is placed on the ice adjacent to the hole, and the fishing pole is placed in a holder on it. When activated, the pole moves up and down in an intermittent cyclic motion, similar to when it is done manually.

The present invention consists of a small electric motor powered by a 12 bolt battery, both of which are contained in a rectangular box. The motor drives a gear assembly similar to those employed in an automotive windshield wiper. This drives a cam that extends from the side of the box. A wire guide for supporting the fishing pole is located adjacent to the cam. As the cam rotates, it contacts the pole and raises and lowers it.

A single person can use more than one of the device of the present invention to improve his/her changes of catching fish. The present invention also allows the fisherman to move around from one hole to another while waiting for a strike. It will be greatly appreciated by all who enjoys ice fishing.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved device for supporting a fishing rod and for providing a periodic lifting motion to the rod to effect jigging comprising, in combination:

a box-like housing in a generally rectangular configuration with a lower bottom wall with front, rear and side edges, upstanding rectangular front and rear walls parallel with each other and extending upwardly from the front and rear edges of the bottom wall and with rectangular side walls parallel with each other and extending upwardly from the side edges of the bottom wall and coupled at their vertical side edges to the vertical edges of the front and rear walls and a rectangular top removably coupled at its periphery to the upper edges of the front, rear and side walls;

screws to removably couple the top wall from the upper edges of the front, rear and side walls;

a fishing rod holder secured to one side wall of the housing at a location adjacent to the back wall, the holder having a lower planar surface in an angular orientation with respect to the top and bottom walls for supporting a central extent of a fishing rod at an angle with its lower most end on the ground, the holder also having a vertically extending wall located outwardly from the supporting side wall of the housings;

a motor mounted within the housing with a battery for providing a source of potential to drive the motor, a power switch located within the housing with a toggle extending exteriorly of the housing through the adjacent side wall thereof opposite from the holder, the toggle movable between an on position wherein the power is provided to the motor and an off position where power to the motor is stopped;

a speed switch mounted in the side wall of the housing adjacent to the switch;

electrical wires coupling the motor, battery and power switch as well as the speed control switch; and a drive rod extending horizontally from the motor through the side wall supporting the holder, the drive rod having an L-shaped member with a long vertical leg coupled at the first end to the rod of the motor and with the second end extending horizontally at a right angle from the first end, the L-shaped member adapted to rotate with the activation of the motor and rotation of the drive shaft, the L-shaped member adapted to periodically contact the fishing rod at a location above and forwardly of the holder to affect its jigging.

2. A device for supporting a fishing rod and providing a periodic lifting motion to the rod to effect jigging comprising, in combination:

a box-like housing in a generally rectangular configuration with a lower bottom wall with front, rear and side edges, upstanding rectangular front and rear walls parallel with each other and extending upwardly from the front and rear edges of the bottom wall and with rectangular side walls parallel with each other and extending upwardly from the side edges of the bottom wall and coupled at their vertical side edges to the vertical edges of the front and rear walls and a rectangular top wall removably coupled at its periphery to the upper edges of the front, rear and side walls;

screws to removably couple the top wall from the upper edges of the front, rear and side walls;

a fishing rod holder secured at one side wall of the housing at a location adjacent to the back wall, the holder having a lower planar surface and an angular orientation with respect to the top and bottom walls for supporting a central extent of the fishing rod at an angle with its lower most end on the ground, the holder also having a vertically extending wall located outwardly from the supporting side walls of the housings;

a motor coupled within the housing with a battery for providing a source of potential to drive the motor, a power switch located within the housing with a toggle extending exteriorly of the housing through the adjacent side wall thereof opposite from the holder, the toggle movable between an on position wherein the power is provided to the motor and an off position where the power to the motor is stopped;

a speed switch mounted in the side wall of the housing with the switch;

electrical wires coupling the motor, battery and switches;

and a drive rod extending horizontally from the motor through the side wall supporting the holder, the drive rod having an L-shaped member with a long vertical leg coupled at a first end to the rod of the motor and with a second end extending horizontally at a right angle from the first end, the L-shaped member adapted to rotate with the activation of the motor and rotation of the drive shaft, the L-shaped member adapted to periodically contact the fishing rod at a location above and forwardly of the holder to effect its jigging.

* * * * *